Patented Aug. 16, 1932

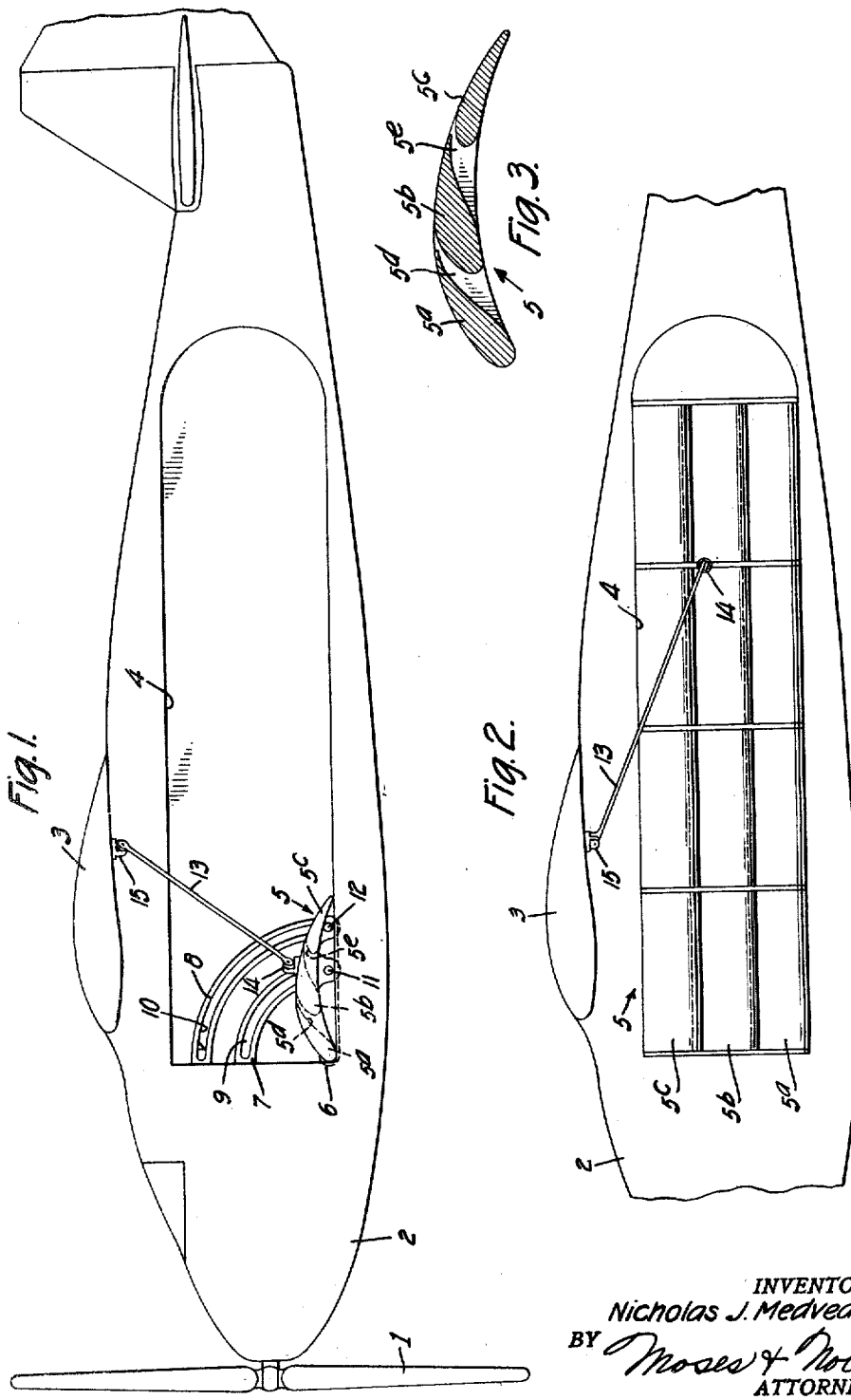

1,872,163

UNITED STATES PATENT OFFICE

NICHOLAS J. MEDVEDEFF, OF LARCHMONT, NEW YORK, ASSIGNOR TO AIRCRAFT IMPROVEMENT CORPORATION, OF NEW YORK, N. Y., A CORPORATION OF DELAWARE

AUXILIARY WINGS FOR AIRPLANES

Application filed May 16, 1930. Serial No. 452,841.

This invention relates to airplanes, and more particularly to auxiliary landing wings for airplanes.

The invention is in the nature of an improvement upon the invention disclosed in my pending application Serial No. 308,489, for retractable wing and landing gear, filed September 26, 1928. In said application disclosure is made of a monoplane provided with stub auxiliary landing wings adapted to be folded in against the fuselage when the plane is in flight, but to be swung forward and turned to a flying position preparatory to landing. A machine equipped with these auxiliary wings is adapted for high speed flight when in the air because of the lowered head resistance secured by the concealing of the wings, and it is also adapted to take off and to be landed at low speed, and therefore safely, because of the increased lift and the increased stalling angle secured when the auxiliary wings are brought into play.

In accordance with the present invention the auxiliary wings are so modified that the stalling angle is further increased so that the airplane may be landed at even lower speed than before, the head resistance encountered when shifting the wings between their operating and non-operating positions is substantially diminished, the strain upon the wings and the shifting mechanism is reduced, and the power required for shifting the wings is reduced.

The head resistance encountered when shifting the wings is due in part to the pressure occurring against the forward surface of the wing and in part to the vacuum resulting at the rear surface of the wing. In accordance with the present invention the auxiliary wings are subdivided by providing slots through them. These slots, in intermediate shifting positions of the wing, permit a considerable amount of air to pass through from the forward to the rear surface, so that the pressure against the forward surface of the wing is reduced, and the vacuum at the rear surface is also reduced. The wing of the present application, therefore, opposes less resistance to forward movement of the plane when being shifted than did the wing of my prior construction, and does not require nearly so much force for shifting it. It is obvious that as a consequence of this reduction in the force required, the strain upon the parts is very greatly diminished.

It is desirable that the wing be so designed that it will assist the pilot in landing at the lowest possible speed. To facilitate this result it is desirable that the wing be responsive to changes of inclination when the angle of attack is large, since the angle of attack is necessarily large at and just before the time when a three point landing is made.

It is known to those skilled in the art that the lift coefficient of an unslotted wing increases with the increase of its angle up to a certain critical angle between twelve degrees and twenty-five degrees, but that beyond that point further increase of the angle of attack does not produce substantially increased lift. It is also known that a properly designed slotted wing has the characteristic that its lift coefficient continues to increase with the increase of its angle beyond the critical angle referred to so that by slotting the wing increased responsiveness at big angles can be obtained. The slotted auxiliary wings of the present invention are so designed that this characteristic is secured.

Other objects and advantages will hereinafter appear.

In the drawing forming part of this specification:

Figure 1 is a fragmentary, side elevation of an airplane embodying the present invention;

Figure 2 is a fragmentary elevation showing the auxiliary wings folded in against the fuselage; and Figure 3 is a vertical, sectional view through the left auxiliary wing looking toward the fuselage.

The illustrative airplane is of the monoplane type comprising a propeller 1, fuselage 2, wings 3, and the usual aerofoil stabilizers and controls at the tail of the machine. The machine also comprises an under-carriage and a tail skid, neither of which is shown.

On each side of the fuselage there is provided a longitudinally extending recess 4 large enough to permit the lower wing 5 to be entirely disposed within it.

The lower wings 5 are pivotally connected to the fuselage at their inner leading edges by a form of universal joint comprising a shaft 6 extending through the fuselage and mounted for rotation. At the outer ends of this shaft pivotal connections are formed by means of which the wings are attached to the shaft. Within each recess 4 there are secured a pair of guides 7 and 8 having arcuate slots 9 and 10, the centers of which are coincident with the axis of rotation of the shaft 6. Shafts 11 and 12 extend through the slots, said shafts being also provided with pivotal connections through which the wings are additionally secured to the fuselage. The several pivotal connections at either side of the fuselage are disposed in a straight line so that the lower wings may be swung about said pivots.

A strut 13 is attached to the upper portion of the wing 5 by a universal connection 14 and to the lower portion of the upper wing 3 by a universal connection 15. Provision is made of suitable mechanism within the fuselage for rotating the shaft 6 to swing the wings 5 from the position shown in Figure 1 to the position of Figure 2 or vice versa. This mechanism may be the same as that disclosed in my pending application hereinbefore referred to. In moving the wings from the position of Figure 1 to that of Figure 2 the operator grasps a handle lever fast on the shaft 6 and moves it from a horizontal position to a vertical position. This action causes rotation of the shaft 6 while the shafts 11 and 12 follow the slotted guides and carry with them the inner trailing ends of the lower wings, the inner edges of the leading ends being constrained to rotate with the shaft 6. The outer ends of the wings, being prevented from following this arcuate course by the struts 13, are drawn gradually rearward so that the wings are swung through a predetermined path until they have been fully folded back into the recesses 4. When it is desired to return the lower wings to flying position the operation above described is reversed.

It will be apparent, of course, that in the course of these movements the wings are moved into positions where their upper sides face the head wind so that a pronounced retarding effect upon the forward movement of the airplane is produced while a considerable force is interposed by the head wind to the swinging of the wings from folded to extended position. Such head resistance and resistance to movement are due in part to the pressure of the head wind against the leading surface of the wing, and in part to the vacuum adjacent the rear surface of the wing. In accordance with the present invention the wing is subdivided into a series of wing sections 5a, 5b, 5c having slots 5d and 5e between adjacent sections. Such subdivision of the wing reduces the head resistance and the opposition to movement of the wing, because it reduces the pressure built up against the leading face of the wing and the vacuum occurring adjacent the rear face of the wing.

Since a primary object of the auxiliary wings is to assist in landing, it is desirable that the wing be designed to be responsive to changes in the angle of attack throughout a wide angular range. The slotting of the wings contributes to this result, it having been found, as pointed out above, that the lift increases with the angle of attack with a properly designed slotted wing through a range extending above the critical or limiting angle found to prevail where the wing is unslotted.

The wing sections 5a, 5b, 5c are accordingly arranged so that all are bounded by a contour line of wing form and so that each extends transversely of the direction of flight. The opening of each slot on the under side of said wing structure is located in advance of the opening of the same slot on the upper side of the wing structure and is wider in the direction of the line of flight than the opening on the upper side of the wing structure.

I have described what I believe to be the best embodiment of my invention. I do not wish, however, to be confined to the embodiment shown, but what I desire to cover by Letters Patent is set forth in the appended claims.

I claim:

1. In an airplane, in combination, a fuselage, fixed wings, auxiliary landing and take-off wings, and means for moving the auxiliary wings between extending flying positions and positions in which they stand edgewise and extend rearwardly along the sides of the fuselage, said means effecting a compound swinging movement of each auxiliary wing about an axis substantially coincident with the flying position of the leading edge, and an axis substantially coincident with the intersection of the wing chord with the fuselage, and involving the raising of the trailing edge so that the upper wing surface faces the head wind, the auxiliary wings being slotted to reduce the air resistance to such movement.

2. In an airplane, in combination, a fuselage, fixed wings, auxiliary landing and take-off wings, and means for moving the auxiliary wings between extended flying positions and positions in which they stand edgewise and extend rearwardly along the sides of the fuselage, said means effecting a compound swinging movement of each auxiliary wing about an axis substantially coincident with the flying position of the leading edge, and an axis substantially coincident with the intersection of the wing chord with the fuselage, and involving the tilting of the wing through a position in which it tends to depress the airplane, the auxiliary wings being slotted to reduce such depression.

In testimony whereof I have affixed my signature to this specification.

NICHOLAS J. MEDVEDEFF.